United States Patent

Plantier et al.

[11] Patent Number: 5,172,222
[45] Date of Patent: Dec. 15, 1992

[54] HIGH DEFINITION COLOR DISPLAY DEVICE

[75] Inventors: Denis Plantier, Bordeaux; Jean-Pierre Gerbe, Pessac; Jean-Noël Perbet, Eysines, all of France

[73] Assignee: Thomson-CSF, Puteaux, France

[21] Appl. No.: 471,594

[22] Filed: Jan. 29, 1990

[30] Foreign Application Priority Data

Feb. 7, 1989 [FR] France .................. 89 01533

[51] Int. Cl.$^5$ .............................................. H04N 9/31
[52] U.S. Cl. ........................................ 358/61; 358/60; 359/40
[58] Field of Search ............... 358/2, 56, 55, 60, 61, 358/64; 350/331 R, 173, 174, 3.7, 3.67, 3.68, 3.69, 3.77; 353/31, 34; 359/40, 41

[56] References Cited

U.S. PATENT DOCUMENTS

| | | | |
|---|---|---|---|
| 3,569,988 | 3/1971 | Schmidt | 358/60 |
| 4,784,447 | 11/1988 | Latta et al. | 350/3.7 |
| 4,832,427 | 5/1989 | Nanba et al. | 350/3.7 |
| 4,850,685 | 7/1989 | Kamakura et al. | 358/61 |
| 4,864,390 | 9/1989 | McKechnie et al. | 358/60 |
| 4,932,731 | 6/1990 | Suzuki et al. | 350/3.7 |
| 4,943,154 | 7/1990 | Miyatake et al. | 358/60 |
| 5,105,265 | 4/1992 | Sato et al. | 359/40 |

FOREIGN PATENT DOCUMENTS 2161615 1/1986 United Kingdom .

OTHER PUBLICATIONS

Holographic Mirrors, Optical Engineering, Sep./Oct. 1985, vol. 24, No. 5, pp. 769–780 J. R. Magarinos, et al.
Digest of Technical Papers of the 1987 SID International Symposium, New Orleans, LA, May 12–14, 1987, vol. XVII, pp. 75–78, S. Aruga, et al., "High-Resolution Full-Color Video Projector with Poly-Si TFT Array Light Valves".

Primary Examiner—Edward L. Coles, Sr.
Assistant Examiner—Kim Yen Vu
Attorney, Agent, or Firm—Oblon, Spivak, McClelland, Maier & Neustadt

[57] ABSTRACT

The device finds application, particularly, in the instrument panels of aircraft, where it comprises: three liquid crystal optical valves, controlled by three electrical signals respectively representing a red image, a green image and a blue image. Two holographic mirrors are utilized, as is a standard mirror and two dichroic strips to illuminate the three valves respectively by three beams, colored red, green and blue, from a single source of white light, while at the same time reducing the space occupied by the optical elements needed to guide the three beams to the minimum. A dichroic cube then superimposes the three beams coming respectively from the three valves and an optical system to form a trichromatic image on a diffusing screen. The optical system collimates the rays coming from the image formed on the diffusing screen to enable an observer to see an image collimated at long distance, with a wide field.

6 Claims, 4 Drawing Sheets

→ WHITE
→ BLUE
→ GREEN
→ RED

FIG.3
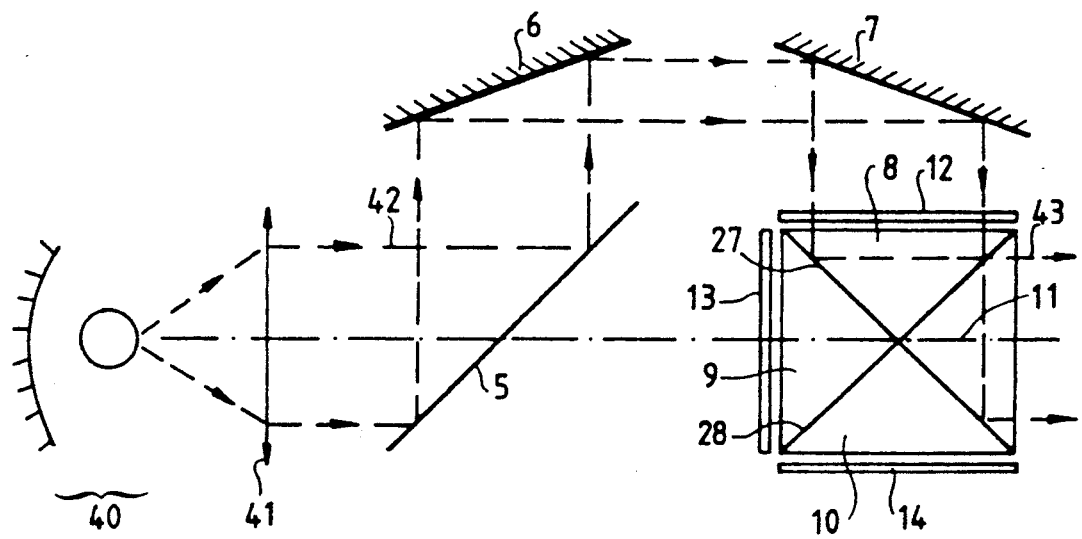
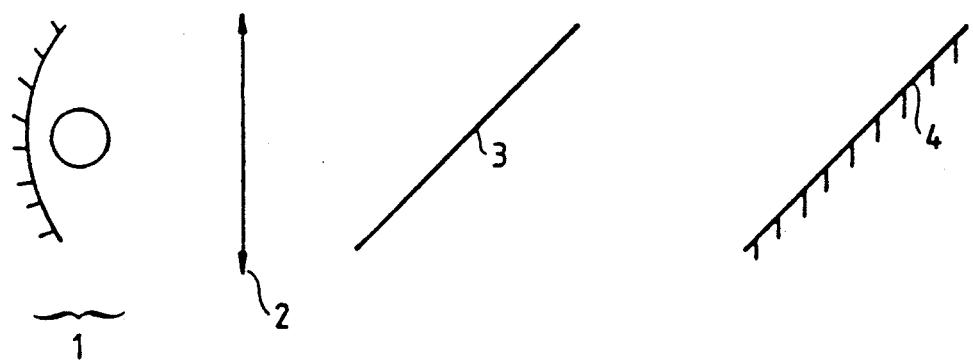
FIG.5

HIGH DEFINITION COLOR DISPLAY DEVICE

BACKGROUND OF THE INVENTION

1. Field of the Invention

The invention concerns a color display device that can be used, notably in the instrument panel of a military aircraft, to give the pilot a high definition color image, and that can also be used in applications for the general public, to make television image projectors.

2. Description of the Prior Art

There is a known method, described notably in the French patent application No. 2 584 257, for making a collimated, high definition color display device comprising:

three cathode-ray tubes controlled respectively by three electrical signals representing, respectively, a red image, a green image and a blue image;

a first optical mixer device having a first dichroic strip to give a beam resulting from the superimposition of a beam of rays coming from the green cathode-ray tube and a beam of rays coming from the red cathode-ray tube;

a second optical mixer device having a second dichroic strip receiving the resultant beam given by the first mixer device and receiving a beam of rays coming from the blue cathode-ray tube to give a beam resulting from the superimposition of the three beams, red, green and blue respectively;

an objective to collimate the resultant beam given by the second optical mixer device and to transmit it towards an observer.

A device such as this enables the observer to perceive a trichromatic image collimated at infinity, or at least at a distance of some meters, to avoid the observer's having to make an effort of visual accomodation when he shifts his sight from outside the aircraft to the display device.

A known device such as this makes it possible to obtain far higher definition and far more efficient luminosity than a single mask-type trichromatic cathode-ray tube or a single trichromatic liquid crystal valve. It naturally takes up more space, but it is possible to envisage the use of a red and blue cathode-ray tube having lower definition than that of the green cathode-ray tube since the eye is less sensitive to the colors red and blue. However, in all cases, this device with two or three cathode-ray tubes has the drawback of taking up much space and, furthermore, raises many problems in superimposing the three images and maintaining this superimposition in spite of the different thermal drifts that affect the position of the images in the tubes, and affect the position of the tubes themselves.

The use of dichroic strips to superimpose the three images given respectively by the three cathode-ray tubes produces colorimetrical aberrations due to the fact that the light rays coming from the cathode-ray tubes do not all have the same incidence on the dichroic strips. For, the dichroic strips have a cut-off wavelength that depends on the angle of incidence. It is possible to consider replacing each cathode-ray tube of this known device by a liquid crystal optical valve, provided with a light box comprising a monochromatic filter and a diffusing screen. The device obtained takes up less space than the device with three cathode-ray tubes, but there remains a reduction in contrast for the light rays coming from the diffusing screen and going through the optical valve are not all orthogonal to the plane of this valve. Now, the attenuation of a light ray by a liquid crystal valve is a function of the angle of incidence of this ray. Furthermore, the colorimetrical aberrations due to the dichroic strips are identical to those of a device with several cathode-ray tubes.

In the field of color television projectors, there is a known way, described in the SID-87 DIGEST, pp. 75 to 78, for making a projection of a trichromatic image on a diffusing screen by means of an optical system comprising:

three liquid crystal optical valves controlled respectively by three electrical signals respectively representing a red image, a green image and a blue image;

a single source of white light;

means to separate the white light into three colored beams, red, green and blue respectively;

means to guide the three colored beams on the three valves;

a dichroic tube to superimpose the three colored beams respectively modulated by the three valves, this dichroic cube being formed by four conjoined prisms, the interfaces of which have dichroic coatings;

a projection objective to form a trichromatic image on a diffusing screen, using the beam resulting from the superimposition of the three colored beams modulated by the three valves.

This prior art device has the advantage of being more compact than a device with two or three cathode-ray tubes, and of using only one white light source, the light emission of which is divided into three spectral bands to obtain the three colored beams. This makes it possible to obtain a given luminosity for a lower electrical consumption than with three light boxes, each provided with a filter, since each filter eliminates two-thirds of the light spectrum and hence wastes a large portion of the energy given to each light box. Furthermore, the problems that arise in superimposing the three images are reduced. For, the position of each pixel is defined by the structure of each valve instead of being defined by the aiming of an electronic beam and the valves are very close to the dichroic tube superimposing the three images.

It is possible to consider adapting this known device in order to make a collimated display device for an aircraft instrument panel. However, it is desirable to achieve the utmost possible reduction in the space occupied by it, namely in its space factor, because the device has to be inserted into a very restricted space behind the instrument panel. The space factor of the device is determined essentially by the space factor of the means used to separate the illumination white light into three colored beams and to guide these three colored beams on to the three valves.

Similarly, to make a projector of television images, for use by the general public, it is desirable to reduce the space occupied by the device, so as to make it more practical to use this device and less costly to manufacture, store and distribute it in the market.

SUMMARY OF THE INVENTION

An aim of the invention is to propose a display device that occupies less space than prior art devices. In particular, an aim of the invention is to reduce the space occupied by light guides while, at the same time, maintaining their function which consists in illuminating the valves uniformly. This reduction in space factor of the light guides makes it possible, while keeping the same size for the valves, to reduce the overall space factor of the device or else it makes it possible, for a given space factor, to use valves having a greater useful size, namely, having an elementary pitch that is greater for one and the same definition of the images.

An object of the invention is a display device wherein at least one of the guides of colored light beams is formed by holographic mirrors. These mirrors have the property of not following the laws of Descartes, and therefore enable a tilt of the mirror that is greater than the tilt of a standard mirror as compared with the beams to be guided. However, a holographic mirror cannot work accurately except in a relatively narrow range of wavelengths and for a pre-determined incidence. In the device according to the invention, each of the beams to be guided has a relatively narrow range of wavelengths, respectively in the red and in the blue, thereby enabling accurate functioning of the holographic mirrors. A holographic mirror even gives even a filtering effect which attenuates the undesirable wavelengths. Furthermore, the beams to be guided are pseudo-parallel and, therefore, have a low range of values of incidence, around a mean value. A holographic mirror, capable of working under these conditions, is then easy to make by known methods.

According to the invention, there is proposed a high-definition color display device comprising three liquid crystal optical valves, each having an optical axis and a plane, these valves being controlled respectively by three electrical signals respectively representing a red image, a green image and a blue image and being placed in such a way that the planes of the valves are orthogonal in twos and are parallel to a common direction; a single source of white light; means to separate the white light into three colored beams of the colors red, green and blue, respectively; means to guide the three colored beams and project them respectively on the three valves, these means to guide the three colored beams comprising at least two holographic mirrors; means to superimpose three beams coming respectively from the three valves, in a single resultant beam; a diffusing screen; means having an optical axis to form a trichromatic image on the diffusing screen, on the basis of the resultant beam; and wherein the white light source has means to form a pseudo-parallel beam of white light, namely a beam parallel to the optical axis of the means to form a trichromatic image on the screen.

BRIEF DESCRIPTION OF THE DRAWINGS

The invention will be understood more clearly and other details will emerge from the following description and from the figures that accompany it:

FIG. 3 represents graphs of transmission of dichroic strips of this exemplary embodiment;

FIG. 5 shows a schematic view of a variant of this exemplary embodiment, further including an emergency illumination device;

MORE DETAILED DESCRIPTION

Figure 1:
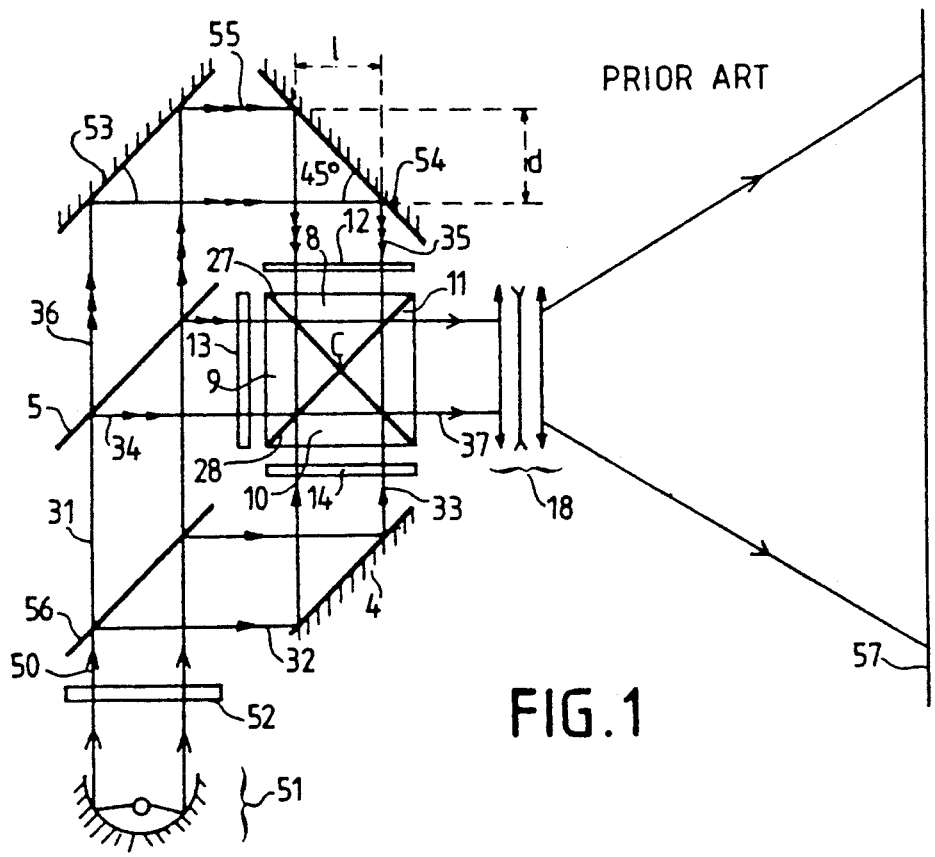
FIG. 1 shows a schematic view of a display device according to the prior art.

FIG. 1 gives a schematic view of the display device described in the document SID-87 DIGEST, pp. 75 to 78. It has three optical valves, 12, 13, 14, respectively controlled by three electrical signals respectively representing a red image, a green image and a blue image. These three valves are illuminated respectively by three beams 35, 34, 33, which are respectively red, green and blue. The three valves 12, 13, 14 have identical dimensions and are arranged in such a way that their optical axes are concurrent at a point C, and are coplanar and orthogonal two by two.

The three beams 33, 34, 35 are obtained by separating a beam of white light into three colored beams. The light beams 35, 34, 33 are modulated, two-dimensionally, respectively by the valves 12, 13 and 14. The three beams coming respectively from the three valves are superimposed in a single resultant beam 37, formed by rays that are all mutually parallel, by means of an optical device that is called a "dichroic cube". The dichroic cube is formed by four identical prisms, 8 to 11, which are conjoined to one another while having a common ridge that goes through the concurrent point C of the optical axes of the valves 12 to 14 and is parallel to the plane of each of these valves. The conjoined faces of the prisms have received a processing that enables them to form two dichroic surfaces 27 and 28.

The valve 12 is parallel to a face of the cube that is formed by the free face of the prism 8. The valve 13 is parallel to a face of the cube formed by the free face of the prism 9. The valve 14 is parallel to a face of the cube formed by the free face of the prism 10. The face of the cube that is formed by the free face of the prism 11 forms the output of the cube giving the resultant beam 36.

Half of the dichroic face 27 is formed by the interface of the prisms 8 and 9, and half of it is formed by the interface of the prisms 10 and 11. Half of the dichroic surface 28 is formed by the interface of the prisms 8 and 11, and half of it is formed by the interface of the prisms 9 and 10. The dichroic surface 27 reflects, towards the output of the cube, the red light beam 35 which has been modulated by the valve 12. The dichroic surface 28 reflects, towards the output of the cube, the blue light beam 33 which has been modulated by the valve 14. The surfaces 27 and 28 let through, without deflection, the green light beam 34 which was modulated by the valve 13.

The resultant beam 37 makes it possible to observe a trichromatic image on a diffusing screen 57, after projection by optical means 18 which may be a standard projection objective.

The red pixels, the green pixels and the blue pixels are perfectly superimposed. This makes it possible to obtain a resolution identical to the resolution of each of the valves 12 to 14. By using, for example, three valves of 1024×1024 pixels, it is thus possible to obtain a trichromatic image of 1024×1024 white pixels. The superimposition of color pixels can be done with far greater precision than with the known device comprising three monochromatic cathode-ray tubes, for the location of each pixel in an optical valve is defined immoveably and independently of the thermal and other drifts. Besides, the mechanical assembly of the three valves and of the dichroic tube is highly compact, thereby reducing the phenomena of drifts due to expansions and to vibrational stresses.

A white light source 51, formed by a xenon lamp and a reflector, gives a beam of white light, 50, which is filtered by a heat-absorbing filter 52. The beam of white light 50 is separated firstly into a beam of green and red light 31 and a beam of blue light 42, by means of a first dichroic strip 56, the plane of which makes an angle of 45° with respect to the axis of the beam 50. The beam 31 comes from the strip 56 in the extension of the beam 50 while the beam 32 comes from the strip 56 perpendicularly to the beam 50. The blue beam 32 is reflected by a standard mirror 4 and then forms a beam 33 reaching the valve 14. Its axis has zero incidence. The plane of the mirror 4 makes an angle of 45° with the axis of the beam 32 and with the plane of the valve 14.

The beam 31 is, in turn, divided into a beam of green light 34 and a beam of red light 36, by means of a second dichroic strip 5, the plane of which forms an angle of 45° with the axis of the beam 31. The beam 36 comes from the strip 5 in the extension of the beam 31 while the green beam 34 is reflected by the strip 5, with an angle of reflection equal to 45°, then reaches the valve 13. Its axis has zero incidence. The red beam 36 is reflected successively by two standard mirrors 53 and 54 which deflect it by 180°. The plane of the mirror 53 makes an angle of 45° with the beam 36. The reflected beam, 55, has an angle of reflection equal to 45°. It reaches the mirror 54 with an angle of incidence of 45° and is then reflected with an angle of reflection of 45° and then forms the beam 35 reaching the valve 12. The axis of the beam 35 has a zero angle of incidence.

It must be noted that the beam from the source 51 of white light is perpendicular to the optical axis of the optical means 18, which contributes to the space factor of the device.

Figure 2:
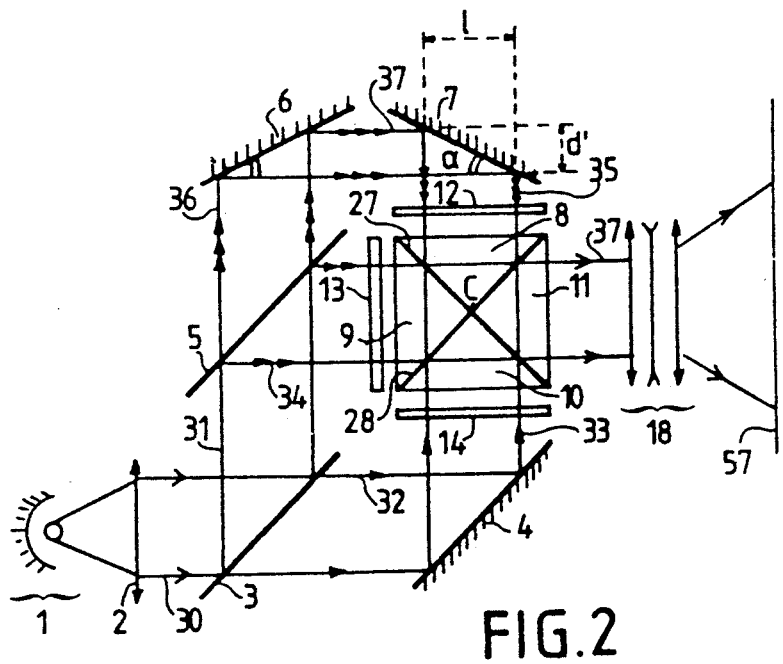
FIG. 2 shows a schematic view of a first exemplary embodiment of the device according to the invention.

FIG. 2 gives a schematic view of a first exemplary embodiment of the display device according to the present invention, more particularly designed to form a projector of television images, for applications pertaining to the general public. It has certain elements that are similar to elements of the device according to the prior art, described above. These similar elements have the same numerical references. For, this first exemplary embodiment includes the following elements: three liquid crystal valves 12, 13, 14; one mixer dichroic cube formed by four conjoined prisms 8 to 11; a standard mirror 4; a dichroic strip 5 transmitting the red color and reflecting the green color; and optical means 18 to project a resultant beam 37 on a diffusing screen 57.

This exemplary embodiment differs from the one shown in FIG. 1 in the position of the source of white light and in the method of making the light guide that leads the red beam 36 towards the valve 12. A source of white light gives a beam 30, the optical axis of which is parallel to the optical axis of the optical means 18 used for the projection. This leads to the use of a dichroic strip 3 which is different from the dichroic strip 56. The source of white light is formed by a xenon lamp 1, provided with a reflector, and by an aspherical condenser 2 collimating all the rays of the beam 30 a infinity.

The dichroic strip 3 has a position identical to that of the strip 56. The dichroic strip 5 and the standard mirror 4 have the same position as in the device according to the prior art. The plane of the strip 3 makes an angle of 45° with the beam of white light 30. A beam of green and red light 31 is reflected with an angle of reflection of 45° while a blue beam 32 is transmitted in the extension of the beam 30. The beam 31 is then divided into a beam of red light 36 and a beam of green light 34, in a manner similar to that described earlier. Similarly, the blue beam 32 is reflected by the mirror 4 in a manner similar to that described previously.

FIG. 3 shows the respective graphs of transmission of the dichroic strips 3 and 5, and of the dichroic surfaces 27 and 28, as a function of the wavelength λ. This wavelength is represented by the letter B, for wavelengths corresponding to the color blue, the letter V for wavelengths corresponding to the color green and the letter R for wavelengths corresponding to the color red. This graph shows that the strip 3 transmits only the color blue, the strip 5 transmits only the color red, the surface 27 transmits the color blue and the color green and the surface 28 transmits the color green and the color red. The untransmitted wavelengths are reflected with low losses.

The fact of using a single source of white light, and two dichroic strips to obtain three colored beams has the advantage of giving high luminous efficiency, as compared with a system of illumination having three sources of white light each provided with a filter eliminating two-thirds of the spectrum. On the other hand, it has one drawback which is a loss of the entire display in the event of failure of the source of white light. An alternative embodiment, described further below, overcomes this drawback in providing for an emergency source of light that does not complicate the making of the display device.

It is possible to have other embodiments to constitute a source of white light giving a pseudo-parallel beam, namely a beam parallel to the optical axis of the optical means 18. The change in orientation of this source of white light enables the display device to be made more compact, as compared with the example of the prior art shown in FIG. 1.

A second difference with the prior art lies in the light guide taking the beam 36 to the valve 12. This guide has two holographic mirrors 6 and 7 achieving a deflection of 180° of the beam 36. The beam 36 reaches the mirror 6 in making an angle of 90° − α with respect to its plane, and is then reflected in making an angle of α with respect to its plane and then forms the beam 37.

The beam 37 reaches the mirror 7 in making an angle of α with respect to its plane, and is then reflected in making an angle of 90° − α with respect to its plane and then forms the beam 35 which is orthogonal to the plane of the valve 12.

The holographic mirrors 6 and 7 do not follow the laws of Descartes. They are fabricated for a given angle of incidence and angle of reflection, and for a relatively narrow range of wavelengths. In the device according to the invention, the colored beams 33, 34, 35 are formed by mutually parallel rays, through the condenser 2. The rays therefore all have the same incidence on the mirrors 6 and 7. In this example, the angle α is chosen to be equal to 60°. The angle of incidence on the mirror 6 is therefore equal to 60° while the angle of reflection is equal to 60°, and the range of wavelengths chosen corresponds to the color red. Since the beam 36 consists of red light exclusively, the holographic mirrors 6 and 7 are in conditions of operation that enable the beam 36 and then the beam 37 to be reflected with a negligible spectral dispersal. This spectral dispersal is also a function of the value of the angle α. This is why it is necessary to choose a value o that is not too close to zero. The holographic mirrors 6 and 7 are fabricated according to a standard method.

It can be seen, in FIGS. 1 and 2, that the space occupied by the light guide formed by the holographic mirrors 6 and 7 is far smaller than that of the guide formed by the mirrors 53 and 54, for the beam 37 has a width d' which is smaller than the width d of the beam 55. In the case of the standard mirrors 53 and 54, the width d of the beam 55 is equal to the useful length 1 of the valve 12. In the case of the holographic mirrors 6 and 7, the width d' of the beam 37 is equal to $1.tg\alpha$, i.e. $1/\sqrt{3}$ in this example. The space occupied by the guide is therefore reduced almost by half. FIGS. 1 and 2 represent the mirrors 6 and 7 further away from the valve 12 than they actually are (this is for greater clarity of the figure and to enable the numerical references to be written in). In practice, one end of the mirror 7 is practically in contact with one end of the valve 12, and this may be laid against the base of the prism 8.

Figure 4:
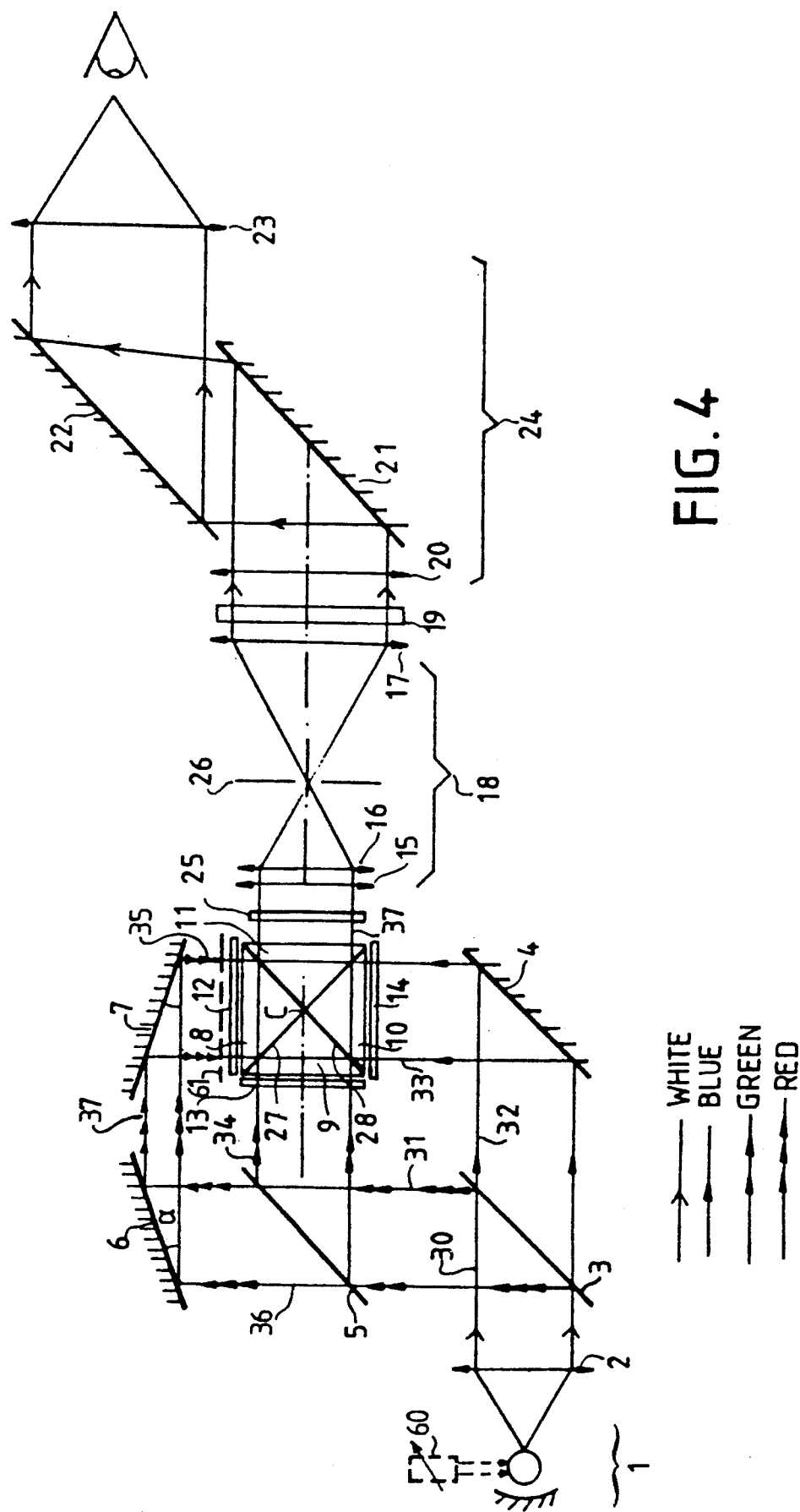
FIG. 4 shows a second exemplary embodiment of the device according to the invention.

FIG. 4 gives a schematic view of a second exemplary embodiment of the device according to the invention, adapted to form a display device collimated for an aircraft instrument panel. The elements similar to those of the first example bear an identical numerical reference.

The trichromatic image at the output of the dichroic cube is visible at an angle of aperture that is too small to be capable of being used directly in a display device for aircraft. There is therefore provision for optical means 18 to increase this aperture in forming a trichromatic image on a diffusing screen 19, using the resultant beam 37. These optical means 18 are formed by an association of lenses 15, 16 and 17.

Optical means 24 collimate, at a distance of 15 meters for example, the rays coming from the image formed on the diffusing screen 19 and shift these rays to make them approach the direction of sight of the observer. The choice of the optical means 24 depends on the constraints of installation of the device on board the aircraft. In this example, the optical means 24 are formed by groups of two lenses 20 and 23 between which two mirrors 21 and 22 are interposed.

In this example, the field of vision given to the observer is of the order of 20°×20°. The value of this field is determined solely by the characteristics of the optical means 24, for given dimensions of the image on the diffusing screen 19. The characteristics of the optical means 24 may therefore be computed independently of the characteristics of the optical means 18, unless it is sought to compensate for the aberrations of the means 18 by the means 24. To reduce the aberrations of the means 18, it is possible also to consider using a spherical diffusing screen 19.

A display device for aircraft requires the use of a very great range of luminance under all possible conditions of illumination. Several approaches are possible in order to obtain such a range.

One approach consists in directly reducing the electrical power given at the lamp. However, since the color of the light varies as a function of this electrical power, it is necessary to add on a colorimetric compensator in the path of one of the colored beams 33, 34, 35. A compensator of this kind may be a liquid crystal shutter. In this case, it is enough to add on a single polarizer before the shutter, the analyzer of this shutter being formed by the polarizer of the optical valve 12, 13 or 14. In FIG. 4, this approach has been represented in dashes by a generator 60 with an adjustable output voltage that supplies the light source 1 and by a shutter placed in the path of the beam 35.

Another approach consists in acting on several elements of the display device located after the cube. To this effect, there is provided an adustable iris 26 placed at the pupil of the optical means 18. This iris enables the luminance of the image to be made to vary. Furthermore, there is provision for a liquid crystal shutter 25 interposed between the output of the dichroic cube and the diffuser 19, on the path of the resultant beam 37. This shutter has a transparency that is variable in a very high ratio. It must be noted that it is necessary to provide for a polarizer in this liquid crystal shutter 25 since the light is already polarized by polarizers incorporated in the optical valves 12 to 14. The association of the iris 26 and of the shutter 25 enable the requisite dynamic range to be obtained.

The liquid crystal valves 12 to 14 and the shutter 25 are of a known type.

FIG. 5 gives a schematic view of an alternative embodiment of the example described heretofore, enabling this device to be backed up in the event of a failure of the white light source 1. This back-up or emergency arrangement enables a monochromatic yellow image to be obtained. I is simple because it has only one source of yellow light 40 giving a beam 42 collimated at infinity. This source 40 is formed by a lamp emitting in the yellow part of the spectrum or by a lamp that emits white light and is provided with a yellow filter. The beam 42 is collimated by a condenser 41.

The beam 42 is parallel to the axis of the white light beam 30 but is translated with respect to it in such a way that it is in the extension of the optical axis of the dichroic cube and of the optical means 18 and 24. The beam 42 reaches the dichroic strip 5 on the side opposite the one by which there arrives the beam of green and red light 31. The yellow beam 42 is reflected by the dichroic strip 5 which is designed to reflect the green light as well as the yellow light, and to let through the red light. The beam 42 then follows the same path as the beam 36, 37, 35 when the source 1 is in operation. The holographic mirrors 6 and 7 are fabricated so as to reflect also the yellow, in addition to the red. The yellow beam thus goes through the valve 12 and is then reflected by the dichroic surface 27 to the interior of the dichroic cube. It forms a beam 43 which replaces the beam 37.

Figure 6:
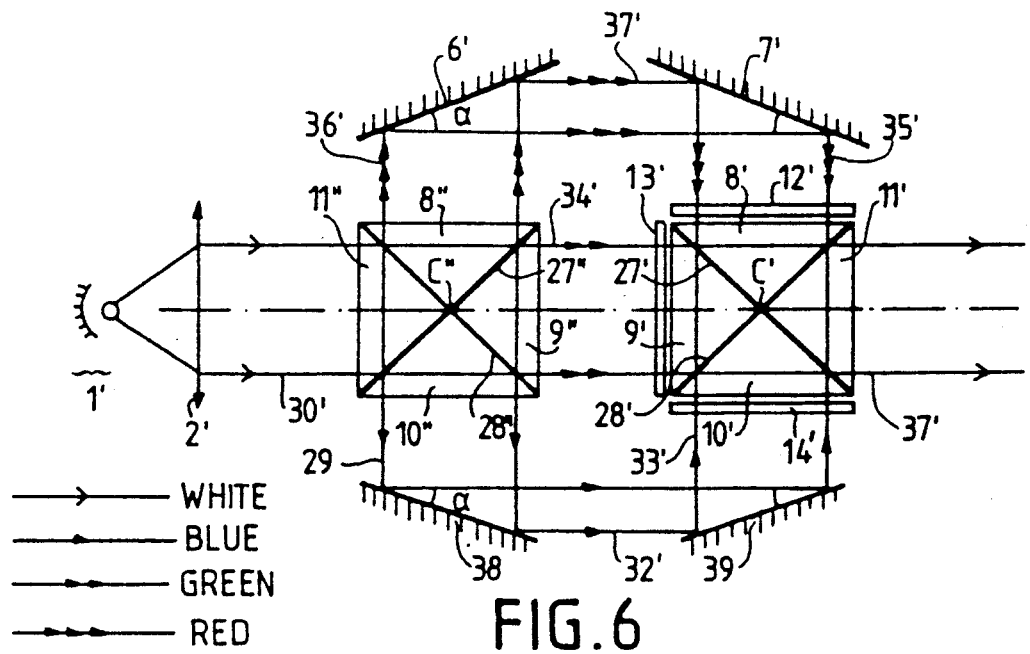
FIG. 6 is a general drawing of a third exemplary embodiment of the device according to the invention.

FIG. 6 shows a schematic view of a third exemplary embodiment of a device according to the present invention, comprising a guide for the red beam and a guide for the blue beam, each formed by two holographic mirrors, in order to reduce also the space occupied by the guide for the blue beam. As mentioned with respect to the first exemplary embodiment, the beam enters the two holographic mirrors forming a guide with a width that is smaller than the useful width of each valve. This enables the space occupied by the guide to be reduced, but has the consequence of making it necessary to use a couple of holographic mirrors. In other words, the mirror 4 of the first exemplary embodiment cannot be simply replaced by a holographic mirror having an orientation different from 45°. This is why this third exemplary embodiment has means different from those of the first example and second example, to separate a beam of white light into three colored beams. These beams are formed by a dichroic cube, called a separator, constituted by four conjoined prisms: 8", 9", 10", 11".

This third exemplary embodiment further includes: three liquid crystal valves 12', 13', 14', a dichroic cube, called a mixer, constituted by four conjoined prisms 8', 9', 10', 11', two holographic mirrors 6' and 7' forming a guide for a red beam, two holographic mirrors 38 and 39 forming a guide for a blue beam, and a source of collimated white light, formed by a lamp provided with a reflector 1' and by a condenser 2'. The elements identical to those of the first exemplary embodiment bear the same numerical references with the index '.

The separator dichroic cube, formed by the prisms 8" to 11", is itself identical to the mixer dichroic cube formed by the prisms 8' to 11'. The centers C" and C' of these cubes are aligned with the optical axis of a beam of white light 30' given by the source of white light. The device is symmetrical with respect to a vertical plane passing between the dichroic cubes and perpendicular to the line C'C". The holographic mirrors 6' and 7' are positioned symmetrically, and the holographic mirrors 38 and 39 are positioned symmetrically. The holographic mirrors 38 and 39 are similar to the holographic mirrors 6' and 7', except that they are fabricated in order to work in a range of wavelengths corresponding to the color blue. They are fabricated according to a standard method.

The conjoined faces of the prisms 8" to 11" have received a treatment enabling them to form two dichroic surfaces 27" and 28" which are respectively identical to the dichroic surfaces 27' and 28' of the mixer dichroic cube. The surface 27" is symmetrical with the surface 27 with respect to the vertical plane of symmetry. In the same way, the dichroic surface 28" is symmetrical with the dichroic surface 28' with respect to the vertical plane of symmetry. The source of white light gives a parallel beam 30' that is applied orthogonally to base of the prism 11". The dichroic surfaces 27" and 28" transmit the green color component which forms a beam 34' that is applied orthogonally to the valve 13'.

The dichroic surface 27" reflects the red component of the beam 30' to form a red beam 36' orthogonal to the beam 30'. The beam 36' is parallel to the beam 33'. The beam 36' is reflected by the holographic mirror 6' and then forms a beam 37' with a smaller width than that of the beam 36'. It is reflected by the holographic mirror 7' and then forms a red beam 35' which is applied orthogonally to the valve 12'. The holographic mirrors 6' and 7' thus deflect the red beam 36' by 180° in restoring a red beam 35' having a width equal to that of the beam 36', and equal to the useful length of the valve 12'. The plane of the holographic mirror 6' is inclined by an angle of $90°-\alpha$ with respect to the beam 36' and the plane of the mirror 7' is inclined by $90°-\alpha$ with respect to the beam 35'. The angle $\alpha$ may be equal to 30° for example.

The path followed by the blue beam 32' is symmetrical with the path followed by the red beam 37', with respect to the straight line C'C". The dichroic surface 28" reflects the blue component of the beam of white light 30', orthogonally to this beam 30'. A blue beam 29 thus emerges from the base of the prism 10", and is then reflected by the holographic mirror 38, to form a blue beam 32' with a width that is smaller than the width of the beam 29. The beam 32' is then reflected by the holographic mirror 39 to form a blue beam 33' which is applied orthogonally to the valve 14' and has a width equal to the useful length of the valve 14'. The plane of the holographic mirror 38 forms an angle of $90°-\alpha$ with the beam 29 which it reflects. The beam 32' reaches the holographic mirror 39 is making an angle $\alpha$ with its plane. The beam 33' sent back by the mirror 39 is making an angle of $90°-\alpha$ with respect to the plane of this mirror.

The mixer dichroic cube restores a resultant beam 37 that then goes through optical means, not shown, to project it on a diffusing screen. This third exemplary embodiment can be applied to the projection of television images for the general public as well as to a display in an aircraft. In the latter case, there is provision for additional means, similar to the means 20 to 26 described earlier.

Figure 7:
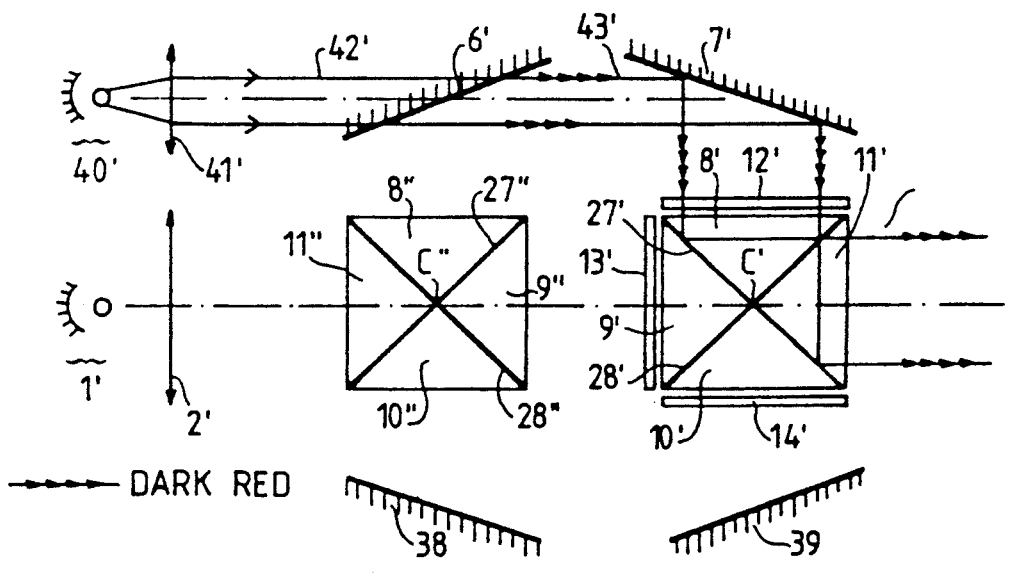
FIG. 7 is a general drawing of a variant of this third exemplary embodiment, further including an emergency illumination device.

FIG. 7 shows a variant of the third exemplary embodiment, further including an emergency source of illumination constituted by a source of white light 40' and a condenser 41'. This source of white light gives a beam 42 with an axis that is parallel to the axis C"C' but is offset in such a way that it goes through the center of the holographic mirrors 6' and 7'. The beam 42' is applied to the mirror 6' in making an angle $\alpha$ with its plane. The dark red part of the beam of white light 42' goes through the holographic mirror 6' and then forms a beam 43 which is reflected by the holographic mirror 7' to be applied orthogonally to the valve 12'. After having been modulated by the valve 12', this beam is reflected by the dichroic surface 27' and then sent towards the axis C"C', and emerges through the base of the prism 11' which forms the output of the mixer dichroic cube.

According to this variant, the holographic mirrors 6' and 7' are not strictly identical since the mirror 6' has to transmit the dark red beam while the mirror 7' has to reflect it.

Figure 8:
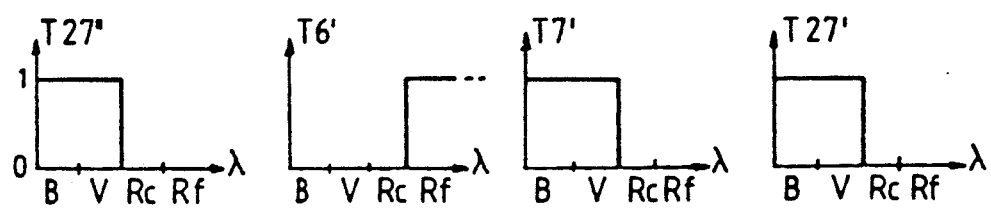
FIG. 8 represents the graphs of transmission of the dichroic strips and of the dichroic surfaces according to this third exemplary embodiment.

FIG. 8 shows the graphs of transmission respectively of the dichroic surfaces 27" and 27', and of the holographic mirrors 6' and 7', for this variant of the third exemplary embodiment. The range of the wavelengths corresponding to the dark red color is identified by the letters Rf. The range of the wavelengths corresponding to the bright red color is identified by the letters Rc. The dichroic surfaces 27" and 27' are similar and transmit the color blue and the color green, but reflect the colors bright red and dark red. The holographic mirror 6' transmits only the dark red and reflects, notably, the bright red. The holographic mirror 7' transmits the blue and the green, and reflects both the bright red and the dark red.

The invention is not restricted to the exemplary embodiments described above. A great many variants are within the scope of those skilled in the art. It is possible, notably, to replace each dichroic cube by two orthogonal dichroic strips at the cost of having a device that takes up more space. In this case, the pairs of dichroic surfaces 27-28, 27'-28' and 27"-28" would each be replaced by two orthogonal dichroic strips.

What is claimed is:

1. A high-definition color display device, comprising:
    a white light source for outputting a pseudo-parallel beam of white light;
    a dichroic cube for separating the beam of white light into three colored beams of colors red, green, and blue, respectively;
    guide means for guiding said red, green and blue colored beams, wherein the guide means for guiding said red beam comprises a first set of two holographic mirrors to deflect the red beam by 180°, and the guide means for guiding said blue beam comprises a second set of two holographic mirrors to deflect the blue beam by 180°;

three liquid crystal optical valves for respectively receiving and modulating the red, green and blue colored beams;

means to superimpose the red, green and blue colored beams coming from said three liquid crystal optical valves into a single resultant beam;

means for forming a trichromatic image on a diffusing screen from said single resultant beam; and an emergency light source for outputting an emergency light beam, the emergency light beam passing through a first holographic mirror of said first set of two holographic mirrors and being reflected by a second holographic mirror of said first set of two holographic mirrors, said emergency light beam forming an image of said diffusing screen.

2. The high-definition color display device according to claim 1, wherein said emergency light source outputs a second beam of white light.

3. The high-definition color display device according to claim 2, wherein said first holographic mirror of said first set of two holographic mirrors is transparent to light from said second beam of white light having a dark red color to thereby allow a dark red beam to pass therethrough, and wherein said second holographic mirror of said first set of two holographic mirrors reflects said dark red beam.

4. The high-definition color display device according to claim 1, wherein the dichroic cube is formed of four prisms having conjoined faces and a common ridge going through a point of concurrence of respective optical axes of said three liquid crystal optical valves, and wherein the conjoined faces of the four prisms form two dichroic surfaces.

5. The high-definition color display device according to claim 1, wherein said display device is used for an aircraft instrument panel, and further comprising:

an adjustable liquid crystal attenuator, interposed on a path of the resultant beam; and optical means to achieve long-distance collimation of the trichromatic image formed on the diffusion screen with an enlarged field.

6. The high-definition color display device according to claim 1, wherein said display device is used for an aircraft instrument panel, and further comprising:

means to adjust the light intensity of the white light source; and at least on a path of one of the three colored beams, an adjustable liquid crystal attenuator to achieve a colorimetrical compensation as a function of the color of the white light given by the source.

* * * * *